United States Patent [19]

Ng et al.

[11] Patent Number: 5,742,810
[45] Date of Patent: Apr. 21, 1998

[54] SYSTEM, METHOD AND COMPUTER PROGRAM PRODUCT FOR PASSING HOST VARIABLES TO A DATABASE MANAGEMENT SYSTEM

[75] Inventors: John Shek-Luen Ng, San Jose; Frederick Thomas Sharp, Menlo Park; Mir Hamid Pirahesh, San Jose; I-Shin Andy Wang, San Jose; Gerald Herman Roth, San Jose; Tak Ming Lo, San Jose, all of Calif.

[73] Assignee: International Business Machines Corporation, Armonk, N.Y.

[21] Appl. No.: 521,710

[22] Filed: Aug. 31, 1995

[51] Int. Cl.⁶ .................................................. G06F 17/00
[52] U.S. Cl. .................. 395/604; 395/610; 395/612; 395/702; 395/704; 395/705
[58] Field of Search ........................... 395/604, 610, 395/612, 705, 704, 702

[56] References Cited

U.S. PATENT DOCUMENTS

| | | | |
|---|---|---|---|
| 4,931,928 | 6/1990 | Greenfield | 364/300 |
| 5,129,086 | 7/1992 | Coyle, Jr. et al. | 395/650 |
| 5,394,546 | 2/1995 | Hanatsuka | 395/600 |
| 5,410,693 | 4/1995 | Yu et al. | 395/600 |
| 5,428,737 | 6/1995 | Li et al. | 395/604 |
| 5,504,886 | 4/1996 | Chang et al. | 395/600 |
| 5,519,859 | 5/1996 | Grace | 395/600 |
| 5,539,909 | 7/1996 | Tanaka et al. | 395/700 |
| 5,544,355 | 8/1996 | Chaudhuri et al. | 395/600 |
| 5,546,455 | 8/1996 | Joyce et al. | 379/265 |
| 5,553,234 | 9/1996 | Cotner et al. | 395/182.14 |
| 5,555,403 | 9/1996 | Cambot et al. | 395/600 |
| 5,564,050 | 10/1996 | Barber et al. | 395/600 |
| 5,566,330 | 10/1996 | Sheffield | 395/600 |
| 5,584,024 | 12/1996 | Schwartz | 395/604 |
| 5,600,833 | 2/1997 | Senn et al. | 395/601 |

OTHER PUBLICATIONS

"How Databases Do Multimedia.", Jenkins, Avery. L. Digital News & Review, V9, n16, p. 87(4), Aug. 24, 1992.
"Interbase Unleashed: Borland's advanced RDBMs.", Anonymous, DBMS, V5, n4, PS7(5), Apr. 1992.
"Informix Online for Netware.", B. Butler, et al. PC Magazine, V12, n17, p. 322(3), Oct. 12, 1993.

*Primary Examiner*—Wayne Amsbury
*Assistant Examiner*—Jean R. Homere
*Attorney, Agent, or Firm*—Sterne, Kessler, Goldstein & Fox P.L.L.C.

[57] ABSTRACT

A system and method for passing arrays and structures as host variables to a stored procedure. An application program packs an array or structure into a binary large object (BLOB) and sends the BLOB to a database management system. An adapter called by the database management system, and coupled to the stored procedure, passes a reference to the data area in the BLOB to the stored procedure. After completion of the stored procedure, the BLOB is returned to the application program. Finally, upon the return from the stored procedure call, the application program unpacks the BLOB back into the array or structure.

34 Claims, 5 Drawing Sheets

SYSTEM, METHOD AND COMPUTER PROGRAM PRODUCT FOR PASSING HOST VARIABLES TO A DATABASE MANAGEMENT SYSTEM

CROSS-REFERENCE TO OTHER APPLICATIONS

The following applications of common assignee contain some common disclosure, and are believed to have an effective filing date identical with that of the present application.

"SYSTEM AND METHOD FOR ENABLING A COMPILED COMPUTER PROGRAM TO INVOKE AN INTERPRETIVE COMPUTER PROGRAM," appl. Ser. No. 08/521,805 (status: pending), incorporated herein by reference in its entirety.

"PLATFORM-TRANSPARENT REGISTRATION AND BUILD OF STORED PROCEDURES AND USER-DEFINED FUNCTIONS," appl. Ser. No. 08/521,804 (status: pending), incorporated herein by reference in its entirety.

"SYSTEM AND METHOD FOR ENABLING POINTERS TO BE PASSED FROM COMPUTER PROGRAMS WRITTEN USING COMPUTER PROGRAMMING LANGUAGES THAT DO NOT SUPPORT POINTERS," appl. Ser. No. 08/521,806 (status: pending), incorporated herein by reference in its entirety.

"NO PREPROCESSOR AND A SOURCE LEVEL DEBUGGER FOR EMBEDDED SQL IN A 3GL," appl. Ser. No. 08/521,711 (status: pending), incorporated herein by reference in its entirety.

DESCRIPTION

1. Technical Field

The present invention relates generally to the interpretation of embedded structured query language (SQL) statements, and more particularly to the passing of host variables to stored procedures.

2. Background Art

In a relational database system, a database is perceived by its users as a collection of tables. For example, one table within the relational database may represent a list of suppliers. This listing may include, for each supplier, a unique supplier number, a supplier name, a location, etc. Significantly, every row and column position within this table has exactly one data value, never a set of values.

In accordance with this structure, database management systems (e.g., DB2) typically support the passing and receiving of scalar values (e.g., integer, strings, etc.) when calling a stored procedure. As generally defined, a stored procedure is a collection of statements that are compiled ahead of time and stored in a server that contains the database management system. These stored procedures can be invoked from a client application program, and serve to reduce the amount of communication between the client application program and a database management system on a server.

Client application programs may be written in any host language supported at the client location (e.g., APL, BASIC, C, COBOL, FORTRAN, PL/I, Assembly, etc.). These host languages generally permit the definition of host variables that may represent arrays or user-defined data structures. In one example, a user-defined data structure may represent an entire row of a particular table within the database. These arrays or user-defined data structures, however, are not recognized as SQL data types. Accordingly, multiple calls to stored procedures are required to fetch the data represented by the host structure or array. This process reduces the efficiency of client/server communication.

Therefore, a system and method for encapsulating, in a stored procedure, all access to a database are needed. More specifically, a system and method for passing host variables, not supported by SQL, to a stored procedure are needed.

DISCLOSURE OF INVENTION

Briefly stated, the present invention is directed to a system and method for passing host variables to a stored procedure. According to the present invention, an embedded SQL statement may pass a host variable that is not a recognized SQL data type to a stored procedure.

In this process, a host variable that is not recognized as an SQL data type is translated into a second data type. This second data type is sent to a database management system on a server. On the server, an adapter called by the database management system, and coupled to the stored procedure, passes a reference to the data area in the second data type to the called stored procedure.

In one aspect of the preferred embodiment, a user-defined structure, containing two and four byte integers, double floating-point numbers, fixed-length strings, etc. is passed to a stored procedure as a host variable. Since this structure is not a recognized SQL data type, the client application program packs the contents of the structure into a binary large object (BLOB) and sends the BLOB to the database management system. Upon receipt, the database management system invokes the adapter for the stored procedure. The adapter passes a reference to the data area in the BLOB to the stored procedure. After the stored procedure populates the data area, the BLOB is ready to be returned to the client.

In another aspect of the preferred embodiment, an array of fixed length strings is passed to a stored procedure as a host variable. Since an array is not a recognized SQL data type, the client application program packs the description and contents of the array into a BLOB and sends the BLOB to the database management system on the server. Upon receipt, the database management system invokes the adapter for the stored procedure. The adapter passes a reference to the array descriptor area in the BLOB to the stored procedure. After the stored procedure populates the data area, the BLOB is ready to be returned to the client.

In another aspect of the preferred embodiment, an array of user-defined structures, each of which is intended to contain a result row from a database, is passed to a stored procedure as a host variable. Again, in the same manner as the translation of the array of fixed length strings, the client application program packs the description and contents of the array of user-defined structure into a BLOB and sends the BLOB to the database management system on the server. Upon receipt, the database management system invokes the adapter for the stored procedure. The adapter passes a reference to the array descriptor area in the BLOB to the stored procedure. After the stored procedure populates the array and returns to the adapter, the BLOB is ready to be returned to the client.

In another aspect of the preferred embodiment, a varying length string is passed to a stored procedure as a host variable. Since a variable length string has a different internal structure from a character data type in SQL, the client application program copies the varying length string to a temporary SQL character data type. This SQL character data type is sent to the database management system on the server. Upon receipt, the database management system invokes the adapter for the stored procedure. The adapter creates a varying length string handle for the data area in the SQL character data type structure and passes the handle to the stored procedure. After the stored procedure populates the structure, the SQL character data type is ready to be returned to the client.

The foregoing and other features and advantages Of the invention will be apparent from the following more particular description of a preferred embodiment of the invention, as illustrated in the accompanying drawings. In the drawings, like reference numbers generally indicate identical, functionally similar, and/or structurally similar elements. The drawings in which an element appears is indicated by the digit(s) to the left of the two rightmost digits in the corresponding reference number.

BRIEF DESCRIPTION OF DRAWINGS

The present invention will be described with reference to the accompanying drawings, wherein.

BEST MODE FOR CARRYING OUT THE INVENTION

The present invention is directed to a system and method for improving the efficiency of communication between a client application program and a database on a server. These efficiency gains are realized through the extension of the traditional use of host variables within embedded structured query language (SQL) statements.

Generally, the present invention lets an embedded SQL statement call a stored procedure utilizing any data type not recognized by an SQL processor. In one example, a host variable may be defined as an array of user-defined data structures. This is contrasted to conventional systems wherein embedded SQL statements in a client application program call stored procedures in a server using only scalar data types.

Figure 1:
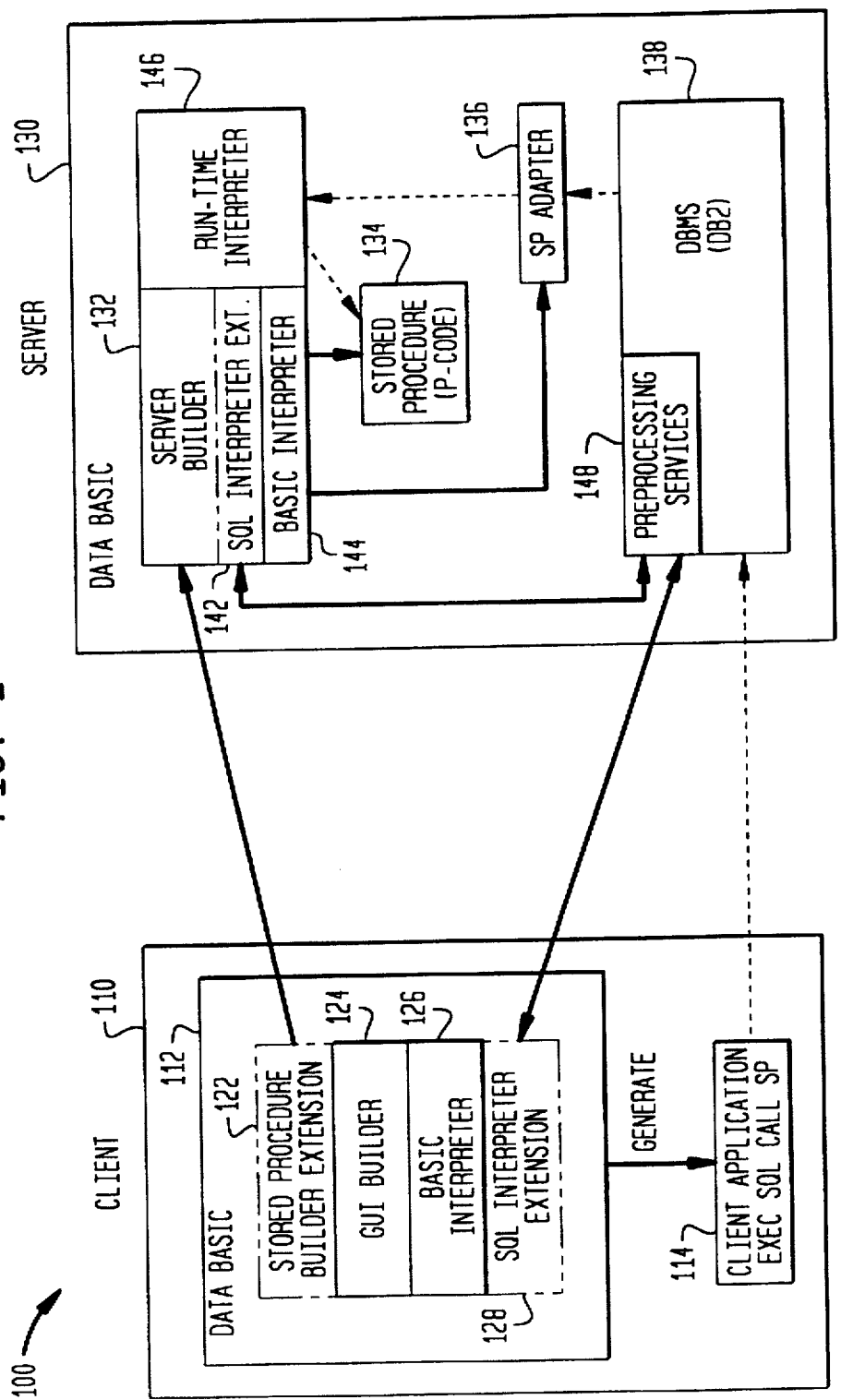
FIG. 1 is a block diagram of a database environment of the present invention.

In a preferred embodiment, the present invention is operative in a client/server application development environment 100 as shown in FIG. 1. Client/server application development environment 100 comprises a client 110 and server 130. In FIG. 1, the solid arrows are used to represent the flow within the development process while the dotted arrows are used to represent the flow within the run-time process. The development process refers to the process of creating either a client application program 114 or a stored procedure 134 on server 130. The run-time process refers to the process of executing a client application program 114 that calls stored procedure 134 on server 130.

Both the development process and the run-time process are controlled by DataBasic elements 112, 132 in client 110 and server 130, respectively, and DBMS 138. The combination of BASIC interpreter 126, GUI builder 124, SQL interpreter extension 128, stored procedure builder extension 122, server builder 140 and BASIC run-time interpreter 146 will be referred to for purposes of this description as DataBasic.

In a preferred embodiment, DataBasic lets a user write client/server applications in the widely used, easy to learn BASIC language. The BASIC programming language is in a preferred embodiment not only for these practical user benefits but also for the additional safety features provided in the development of database stored procedures. For example, because BASIC has no pointers, database memory cannot be manipulated by the stored procedure.

As will become apparent from the following more detailed description, the choice of the BASIC programming language in the client/server application development environment 100 is independent of the conceptual framework of the present invention. In other words, the present invention is equally applicable to a client/server application development environment that utilizes any other computer language as a host language. Accordingly, the components within client 110 and server 130 are intended to represent a generic functionality applicable to a generic client/server application development environment. Client/server application development environment 100 is now described in greater detail.

As FIG. 1 illustrates, client 110 comprises DataBasic element 112. DataBasic element 112 further comprises a BASIC interpreter 126, SQL interpreter extension 128, graphical user interface (GUI) builder 124 and stored procedure builder extension 122. Generally, BASIC interpreter 126 and SQL interpreter extension 128 combine to permit the parsing of BASIC source code written by a user. This BASIC source code includes embedded SQL statements that call stored procedures on server 130. After the parsing is completed, a client application program 114 is produced and stored as p-code. P-code exists as an intermediate code that may be described as optimized abstract machine code. Stored procedure builder extension 134, on the other hand, sends a file or files of BASIC source code to server 130 for the creation of a stored procedure.

Server 130 comprises DataBasic element 132 and database management system (DBMS) 138 (e.g., DB2). DBMS 138 further comprises pre-processing services 148. Pre-processing services 148 interacts with SQL interpreter extension 128 in the parsing of embedded SQL statements. DataBasic element 132 further comprises a server builder 140 and run-time interpreter 146. Server builder 140 further comprises BASIC interpreter 144 and SQL interpreter extension 142 that operate in the same manner as their counterparts 126 and 128 on client 110. More specifically, BASIC interpreter 144 and SQL interpreter extension 142 parse the BASIC source code sent by client 110 and generate stored procedure 134.

In addition, server builder 140 generates an adapter 136 for stored procedure 134. Generally, at run-time, adapter 136 passes a reference to a data area in the translated host variable that is passed in an embedded SQL statement.

As briefly described above, the components in client 110 and server 130 combine to create a client/server application development environment 100 that includes both development and run-time processes. Specifically, the development process includes (1) the development of client application programs, and (2) the development of stored procedures 134 on server 130. The run-time process includes the execution of client application programs that call stored procedures on server 130. Each of these processes is described in detail below.

Creation of Client Application Program

Figure 3:
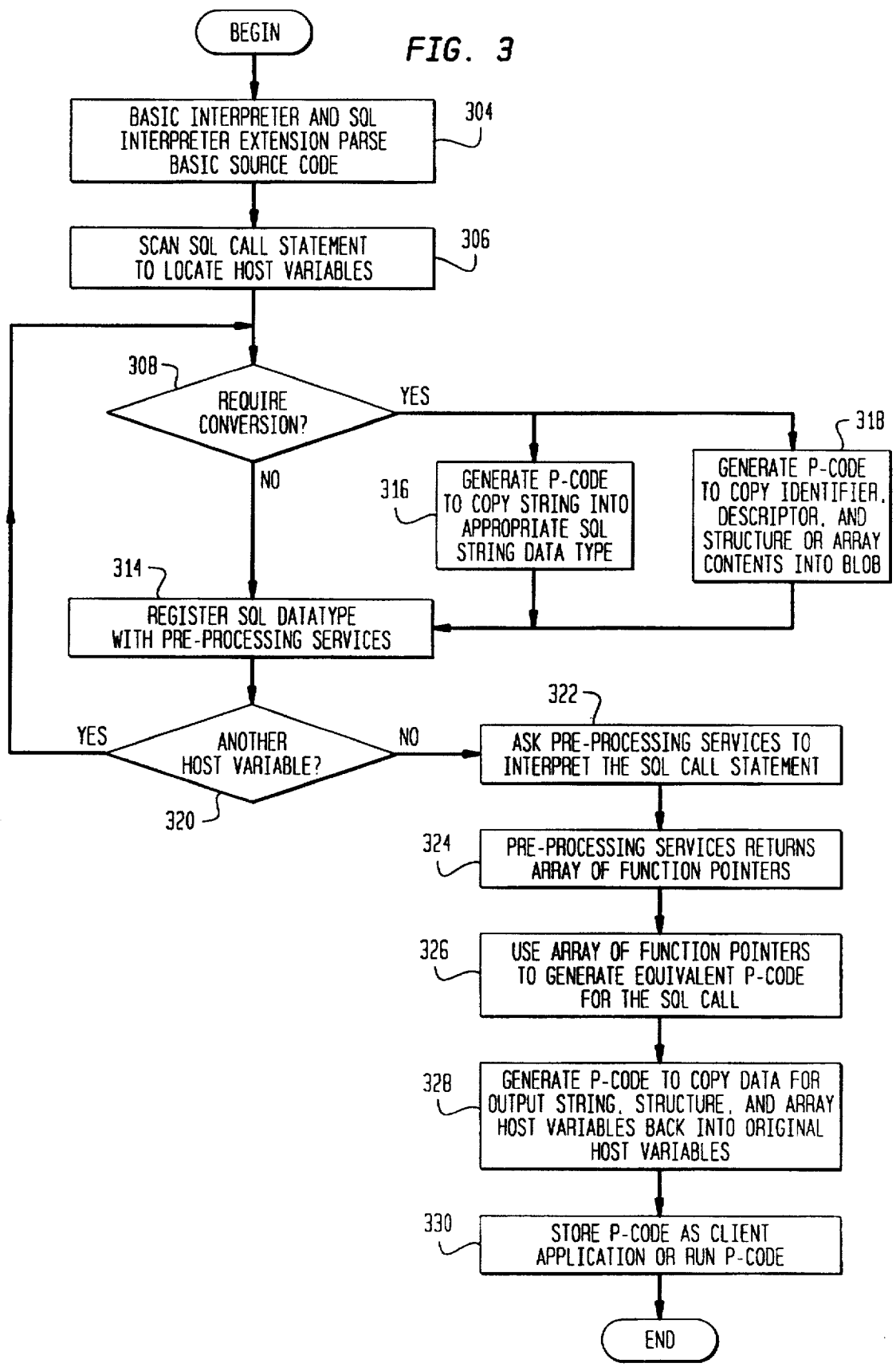
FIG. 3 is a flow chart illustrating the process of generating a client application.

The creation of a client application program is described with reference to FIG. 1 and the flow chart in FIG. 3. The flow chart in FIG. 3 is operative generally on source code written by a user. In a preferred embodiment, the source code is written in the BASIC programming language. The BASIC source code includes embedded SQL statements that may be executable or purely declarative. C. J. Date, "An Introduction to Database Systems", vol. I, Fifth Edition, Addison-Wesley Publishing Company, 1990, describes the general operation of SQL statements within database systems and is herein incorporated by reference in its entirety.

The present invention is concerned primarily with embedded SQL statements that are executable. Specifically, the present invention is applicable to embedded SQL statements that call stored procedures in server 130 using host variables that are not recognized SQL data types. A host variable is defined simply as a variable defined in any one of the host languages on client 110. The following listing of selected code statements provides an illustrative example.

| 1  | Type     | SalaryTyp           |                |
|----|----------|---------------------|----------------|
| 2  |          | Name                | As String * 80 |
| 3  |          | Dept                | As Integer     |
| 4  |          | Salary              | As Double      |
| 5  | End Type |                     |                |
| 6  | Dim      | SalaryGrid (5) as SalaryTyp        |   |
| 7  | dim      | LastRowIndex as long               |   |
| 8  | dim      | ind1 as integer                    |   |
| 9  | dim      | ind2 as integer                    |   |
| 10 | EXEC     | SQL CALL GetSalary (:SalaryGrid:ind1, :LastRowIndex:ind2) END EXEC |   |

In these selected code statements, lines 1–6 create a user-defined structure (i.e., "SalaryTyp") that is dimensioned in an array of length five (i.e., "SalaryGrid"). Lines 7–9 further define host variables used in the embedded SQL statement of line 10. In summary, the embedded SQL statement is identified by the recitation of "EXEC SQL" at the beginning of the line and the recitation of "END EXEC" at the end of the line. The "CALL" recitation on line 10 calls a stored procedure "GetSalary" on server 130. The stored procedure is identified by two methods. In a first method "GetSalary" is identified in a stored procedure catalog (not shown) on server 130. In a second method, "GetSalary" is preceded by a "-." This identifies "GetSalary" as a host variable that has been previously defined in the source code.

The inclusion of a ":" prior to the variables "SalaryGrid", "ind1", "LastRowIndex", and "ind2" also identifies those variables as host variables. These host variables are passed to the stored procedure "GetSalary". As described above, conventional systems permit the passing of host variables that are only scalar data types. The present invention, however, permits the passing of host variables that may be defined as an array (possibly multidimensional) of any user-defined data structure. This process, which includes the packing of the array into a binary large object (BLOB), is described with reference to FIGS. 1 and 3.

In step 304, a file containing the source code segment listed above is parsed through a combination of BASIC interpreter 126 and SQL interpreter extensions 128. BASIC interpreter 126 interprets the BASIC statements while SQL interpreter extension 128 interprets embedded SQL statements. In particular, SQL interpreter extension 128 identifies embedded SQL statements that call a stored procedure in server 130. This is accomplished through the identification of the recitation "EXEC SQL CALL" in the source code.

After an "EXEC SQL CALL" statement is found, the stored procedure call is scanned in step 306. Specifically, all host variables in the SQL CALL statement are identified by the inclusion of a ":" at the beginning of the variable. For each of the host variables identified in step 306, step 308 determines whether conversion to an SQL recognized data type is required. If no conversion is required, step 314 registers the host variable with pre-processing services 148.

If the host variable requires conversion, then steps 316 and 318 are selectively utilized. Specifically, if the host variable is a string that does not correspond to an SQL string data type (e.g., varying length string), then step 316 generates p-code to copy the string into an appropriate SQL character data type. The SQL character data type is then registered with pre-processing services 148 in step 314.

If the host variable is a user-defined structure or an array then step 318 generates p-code to copy an identifier, descriptor and the array or structure contents into a BLOB. The BLOB is then registered with pre-processing services 148 in step 314. A user-defined structure may contain any combination of two and four byte integers, double floating-point numbers, fixed length strings, etc. Arrays, on the other hand, may comprise a plurality of fixed-length strings, user-defined structures, etc.

As would be appreciated by one of ordinary skill in the relevant art, steps analogous to steps 316 and 318 may be added to convert any non-SQL data type to a recognized SQL data type.

After a host variable is registered as an SQL data type, step 320 determines whether any other host variables require examination. If so, steps 308 to 314 are selectively invoked.

If all host variables have been examined and registered, SQL interpreter extension 128 asks pre-processing services 148 to interpret the SQL CALL statement containing the registered host variables. This process is illustrated as step 322.

Upon receipt of the embedded SQL statement, pre-processing services 148 returns an array of function pointers to SQL interpreter extension 128 in step 324. This array of function pointers represents low-level application program interface (API) function calls that are used to generate equivalent p-code for the SQL CALL. This process is illustrated as step 326. A complete description of the pre-processor APIs is provided in several DB2 manuals, such as DATABASE 2 AIX/6000 Programming Reference, SC09-1573 (1993), "Appendix D. Precompiler Customization," pages 307–372 which is herein incorporated by reference in its entirety.

These API function calls let client application program 114 call the stored procedure using a BLOB as a parameter. Prior to generating p-code for calling the stored procedure, however, the SQL interpreter extension 128 generates p-code to use run-time library function calls to (1) pack the structure or array into the BLOB, and (2) unpack the BLOB that is returned after execution of the stored program. The contents of the BLOB is described in greater detail in the run-time section that follows below.

Finally, in step 330, DataBasic stores the p-code as client application program 114. Client application program 114 is now ready for execution. In the alternative, a user could also immediately execute the p-code without storing it.

Creation of Stored Procedure

The creation of a stored procedure represents a second aspect of the development phase. This process is described with reference to FIGS. 1 and 4.

Figure 4:
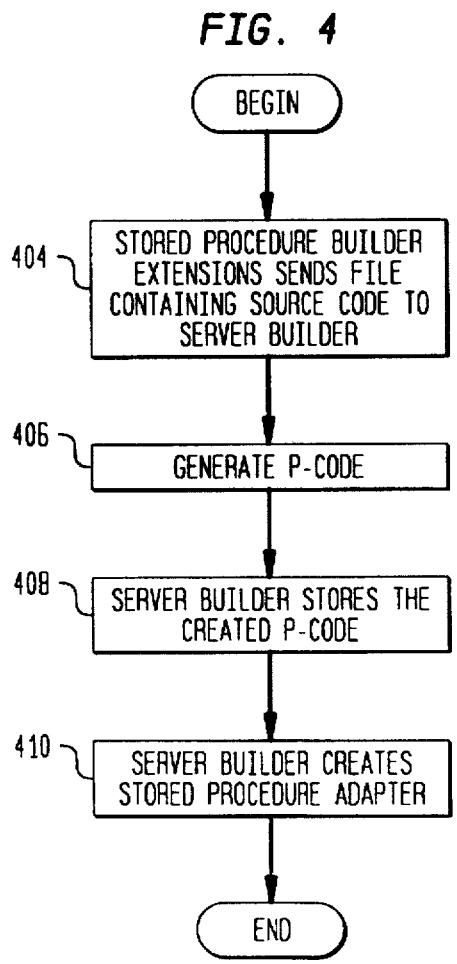
FIG. 4 is a flow chart illustrating the process of generating a stored procedure.

As the flow chart of FIG. 4 illustrates, a source code file is interpreted at server 130 rather than client 110. Specifically, in step 404, stored procedure builder extension 122 sends a file containing the source code to server builder 140. This process is described in detail in co-pending application "PLATFORM TRANSPARENT REGISTRATION AND BUILD OF STORED PROCEDURES AND User-defined FUNCTIONS," Attorney Docket No. ST9-95-032 (1252.2290000), which is herein incorporated by reference in its entirety.

Upon receipt, step 406 generates p-code in a similar manner as the process described in steps 304 to 328 of FIG. 3. The primary difference is the use of BASIC interpreter 144 and SQL interpreter extension 142 on server 130 rather than BASIC interpreter 126 and SQL interpreter extension 128 on client 110. After step 406 is completed, the process moves to step 408 where server builder 140 generates stored procedure 134.

Finally, in step 410, an adapter 136 is generated for stored procedure 134. This process, is described in greater detail in co-pending application "SYSTEM AND METHOD FOR ENABLING A COMPILED COMPUTER PROGRAM TO INVOKE AN INTERPRETIVE COMPUTER PROGRAM," Attorney Docket No. ST9-95-028 (1252.2230000), which is herein incorporated by reference in its entirety. Stored procedure adapter 136 is utilized to pass a reference to a data area in a translated host variable to the stored procedure 134. For example, if a structure is converted to a BLOB, adapter 136 is utilized to pass a reference to the data area in the BLOB to stored procedure 134.

As should be clear to one of ordinary skill in the relevant art, adapter 136 may be created to match any data type created in a host language to any data type utilized in a stored procedure written in a second language. For example, a host variable passed from a client application program written in BASIC could be passed via an adapter to a stored procedure written in C. This represents merely one of the possible permutations of translation possibilities.

Execution of Client Application Program

Figure 5:
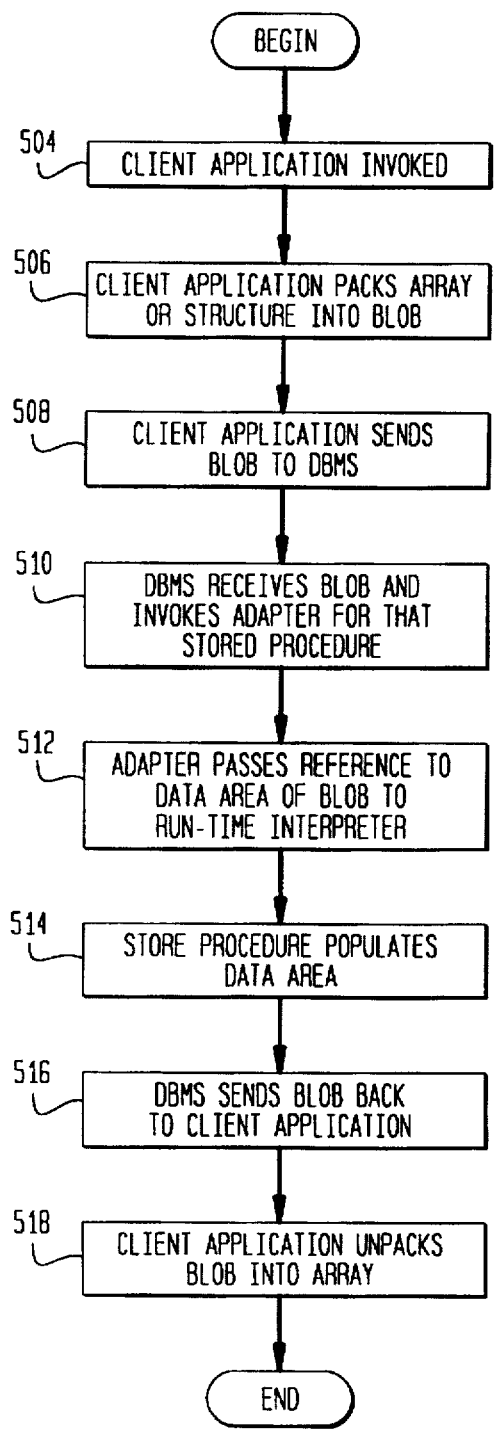
FIGS. 5 and 6 are flow charts illustrating the process of executing a client application.
Figure 6:
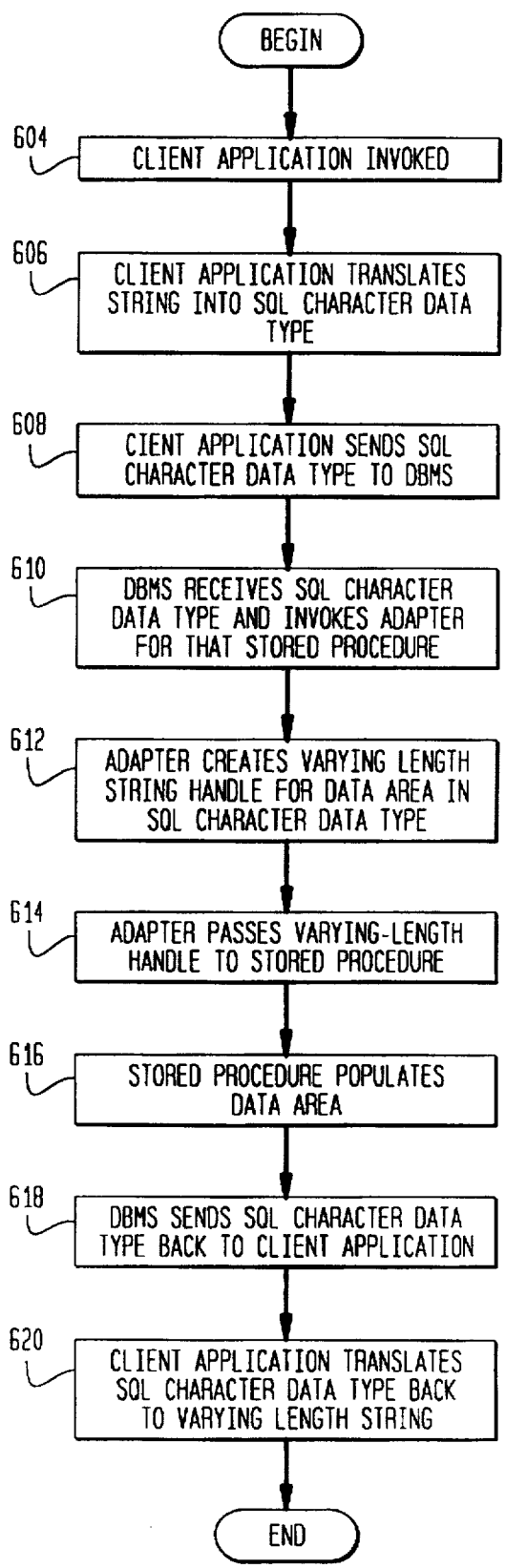

The execution of a client application program is described with reference to FIGS. 1, 5 and 6. FIG. 5 illustrates a flow chart that identifies the sequence of steps in passing an array or structure as a host variable to a stored procedure. FIG. 6 illustrates a flow chart that identifies the sequence of steps in passing varying length strings as a host variable to a stored procedure.

In FIG. 5, the process begins in step 504 where an application program is invoked. In step 506, the API function calls that were included in the p-code of client application program 114 pack the array or structure into a BLOB.

Figure 7:
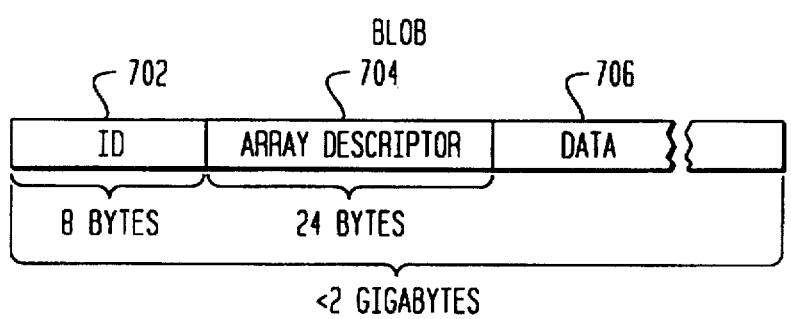
FIG. 7 shows the components of the representation of an array or structure in a binary large object.

This BLOB comprises three sections that are illustrated in FIG. 7. Section 702 is 8 bytes long and contains a string that identifies the BLOB as an array or structure. Section 704 is 24 bytes long and contains an array descriptor. This array descriptor includes information that identifies the dimension of the array, the data types within the array, the lower bound and maximum extent (or length) of data section 706, etc. Section 704 is not needed for the passing of user-defined structures.

Finally, section 706 is reserved for the data that is identified by the user-definition of the array in the host language. As a system defined limit of DB2, the BLOB may extend up to a maximum size of two gigabytes. Clearly, this value is dependent on the system implementation and not on the inventive framework envisioned for the passing of host variables. Moreover, in the passing of arrays as host variables, a character large object (CLOB) may also be used in the packing/unpacking process. Generally, the choice of a particular large object (i.e., CLOB or BLOB) is independent of the conceptual framework of the system design.

After the array is packed into a BLOB in step 506, it is sent to DBMS 138 in step 508. Next, in step 510, DBMS 138 invokes adapter 136 for the stored procedure. In step 512, adapter 136 passes a reference to data area 606 to run-time interpreter 146 if a structure is packed into the BLOB. If an array is packed into the BLOB, adapter 136 passes an indirect reference to data area 606 via a reference to descriptor area 604. Thereafter, the array or structure is usable by stored procedure 134 which populates data area 606 in step 514.

After the execution of stored procedure 134 is complete, the BLOB contains the data that the stored procedure placed into the array or structure. The BLOB is now available for transport back to client application program 114. This process is represented by steps 516 and 518, which are the reverse of steps 506 and 508. Specifically, in step 516, DBMS 138 sends the BLOB back to client application program 114. Finally, in step 518, client application program 114 unpacks the BLOB into an array or structure for use by the remainder of client application program 114.

FIG. 6 illustrates the sequence of steps in passing varying length strings as a host variable to a stored procedure. The process begins in step 604 where client application program 114 is invoked. In step 606, the API function calls that were included in the p-code of client application program 114 translates the varying length string into a SQL character data type. This SQL character data type is sent to DBMS 138 in step 608.

In step 610, DBMS 138 receives the SQL character data type and invokes adapter 136 to interpret the SQL character data type. In step 612, adapter 136 creates a varying length string handle for the data in the SQL character data type. This varying length string handle is passed by adapter 136 to stored procedure 134 in step 614. Thereafter, stored procedure 134 populates the data area of the SQL character data type in step 616.

After the execution of stored procedure 134 is complete, the SQL character data type contains the data that the stored procedure placed into the varying length string. the SQL character data type is now available for transport back to client application program 114. In step 618, DBMS 138 sends the SQL character data type back to client application program 114. Finally, in step 620, client application program 114 translates the SQL character data type back into varying length string for use by the remainder of client application program 114.

Implementation of Client/Server

Figure 2:
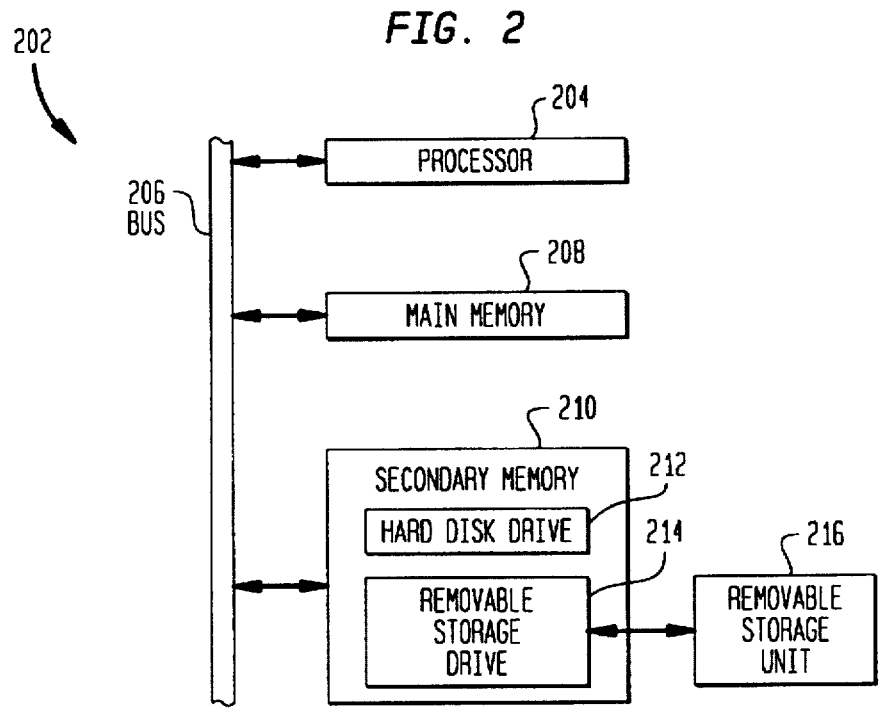
FIG. 2 is a block diagram of a computer useful for implementing elements of the invention.

In the present invention, client 110 and server 130 are implemented by a computer system 202 as shown in FIG. 2. The computer system 202 includes one or more processors, such as processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 218 in a well known manner.

Removable storage unit 218, also called a program storage device or a computer program product, represents a floppy disk, magnetic tape, compact disk, etc. As will be appreciated, the removable storage unit 218 includes a computer usable storage medium having stored therein computer software (e.g., program instructions) and/or data.

Computer programs (also called computer control logic) are stored in main memory and/or the secondary memory 210. Such computer programs, when executed, enable the computer system 202 to perform the features of the present invention as discussed herein. In particular, the computer programs, when executed, enable the processor 204 to perform the features of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A system for passing arrays or structures as host variables to a stored procedure, comprising:
    means for packing an array or structure into a large object;
    means for sending said large object to a database management system, wherein said large object comprises a descriptor area and a data area; and
    an adaptor, coupled to said database management system, for passing a reference to said data area to the stored procedure.

2. The system of claim 1, further comprising:
    means for returning said large object to a user after the stored procedure has populated said data area of said large object; and
    means for unpacking said large object returned to said user back into said array or structure.

3. The system of claim 1, wherein the array is an array of scalar values.

4. The system of claim 1, wherein the array is an array of instances of a user-defined structure.

5. The system of claim 1, wherein the array is multi-dimensional.

6. A system for passing host variables to a stored procedure, comprising:
    means for packing the contents of a first data type, defined in a host language, into a second data type, wherein said first data type is not a recognized SQL data type and said second data type is a recognized SQL data type;
    means for sending said second data type to a database management system; and
    adapting means, coupled to said database management system, for passing a reference to a data area in said second data type that is associated with said first data type to the stored procedure.

7. The system of claim 6, wherein said first data type is a variable length string and said second data type is a SQL character data type.

8. The system of claim 6, wherein said first data type is an array and said second data type is a large object, said large object having an array descriptor area and a data area.

9. The system of claim 6, wherein said first data type is a user-defined structure and said second data type is a large object.

10. A system for generating a client application/stored procedure, comprising:
    means for interpreting source code written in a host language;
    means for generating p-code to pack the contents of a host variable into a large object, wherein said host variable is not a recognized SQL data type, and wherein said large object is a recognized SQL data type;
    means for registering said large object with a pre-processing service means in a database management system;
    means for receiving an array of function pointers from said pre-processing means;
    means for using said array of function pointers within the client application/stored procedure to call a stored procedure; and
    means for generating p-code to unpack the contents of said large object returned from the stored procedure into said host variable.

11. The system of claim 10, wherein said host variable is a user-defined structure.

12. The system of claim 10, wherein said host variable is an array.

13. The system of claim 10, wherein said host variable is a multi-dimensional array.

14. A method for passing arrays or structures as host variables to a stored procedure, comprising the steps of:
    packing a first array or structure into a large object;
    sending said large object to a database management system on a server, wherein said large object comprises a descriptor area and a data area;
    invoking an adapter for the stored procedure, wherein said adapter is coupled to said database management system;
    said adapter passing a reference to said data area to the stored procedure.

15. The method of claim 14, further comprising the steps of:
    returning said large object to a user; and
    unpacking said large object back into said first array or structure.

16. The method of claim 14, wherein said step of packing comprises the step of packing an array of scalar values into a large object.

17. The method of claim 14, wherein said step of packing comprises the step of packing an array of instances of a user-defined structure into a large object.

18. The method of claim 14, wherein said step of packing comprises the step of packing a multi-dimensional array into a large object.

19. A method for passing host variables to a stored procedure, comprising the steps of:
    packing the contents of a first data type, defined in a host language, into a second data type, wherein said first data type is not a recognized SQL data type and said second data type is a recognized SQL data type;

sending said second data type to a database management system; and passing a reference to a data area in said second data type that is associated with said first data type to the stored procedure.

20. The method of claim 19, wherein said step of translating a first data type comprises the step of translating a varying length string into a second data type that is a recognized SQL data type.

21. The method of claim 19, wherein said step of translating a first data type comprises the step of translating an array into a large object.

22. The method of claim 19, wherein said step of translating a first data type comprises the step of translating a user-defined structure into a large object.

23. A method for generating a client application/stored procedure, comprising the steps of:

interpreting source code written in a host language;

generating p-code to pack the contents of a host variable into a large object, wherein said host variable is not a recognized SQL data type, and wherein said large object is a recognized SQL data type;

registering said large object with a pre-processing service means in a database management system;

receiving an array of function pointers from said pre-processing means;

calling a stored procedure using said array of function pointers within the client application/stored procedure; and generating p-code to unpack the contents of said large object returned from the stored procedure into said host variable.

24. The method of claim 23, wherein said step of generating comprises the step of generating p-code to pack the contents of a user-defined structure into a large object.

25. The method of claim 23, wherein said step of generating comprises the step of generating p-code to pack the contents of an array into a large object.

26. The method of claim 23, wherein said step of generating comprises the step of generating p-code to pack the contents of a multi-dimensional into a large object.

27. A program storage device readable by a machine, tangibly embodying a program of instructions executable by the machine for passing data structures as host variables to a stored procedure, the program of instructions comprising the steps of:

packing the contents of a first data type, defined in a host language, into a second data type, wherein said first data type is not a recognized SQL data type and said second data type is a recognized SQL data type;

sending said second data type to a database management system; and passing a reference to a data area in said second data type that is associated with said first data type to the stored procedure.

28. The program storage device of claim 27, wherein said step of translating a first data type comprises the step of translating a varying length string into a second data type that is a recognized SQL data type.

29. The program storage device of claim 27, wherein said step of translating a first data type comprises the step of translating an array into a large object.

30. The program storage device of claim 27, wherein said step of translating a first data type comprises the step of translating a user-defined structure into a large object.

31. A program storage device readable by a machine, tangibly embodying a program of instructions executable by the machine for generating a client application/stored procedure, the program of instructions comprising the steps of:

interpreting source code written in a host language;

generating p-code to pack the contents of a host variable into a large object, wherein said host variable is not a recognized SQL data type, and wherein said large object is a recognized SQL data type;

registering said large object with a pre-processing service means in a database management system;

receiving an array of function pointers from said pre-processing means;

calling a stored procedure using said array of function pointers within the client application/stored procedure; and generating p-code to unpack the contents of said large object returned from the stored procedure into said host variable.

32. The program storage device of claim 31, wherein said step of generating comprises the step of generating p-code to pack the contents of a user-defined structure into a large object.

33. The program storage device of claim 31, wherein said step of generating comprises the step of generating p-code to pack the contents of an array into a large object.

34. The program storage device of claim 31, wherein said step of generating comprises the step of generating p-code to pack the contents of a multi-dimensional into a large object.

* * * * *